Sept. 23, 1958  H. K. JARRETT  2,853,422
LIPSTICK COMPOSITION
Filed Sept. 15, 1953

INVENTOR.
HENRY K. JARRETT
BY
ATTORNEYS

United States Patent Office 2,853,422
Patented Sept. 23, 1958

2,853,422
LIPSTICK COMPOSITION
Henry K. Jarrett, Kew Gardens Hills, N. Y.
Application September 15, 1953, Serial No. 380,293
2 Claims. (Cl. 167—85)

My invention relates to a new and improved lipstick or other cosmetic or article, and a new and improved method of making the same. The invention includes the new and improved lipstick or other cosmetic or article, irrespective of its method of manufacture.

In the ordinary type of lipstick, an oil-soluble and water-insoluble dye is dissolved in an oil or other solvent, which is uniformly blended with a base which contains wax.

Water-soluble dyes have also been employed in conjunction with carmine and other lakes to make a type of lipstick which has been designated as "indelible." Since these water-soluble dyes are insoluble in the base or body of the "indelible" lipstick, such dry water-soluble dyes are ground finely and stirred into the fused waxy base of the "indelible" lipstick before casting the "indelible" lipstick. These so-called "indelible" lipsticks are moistened before use. When this moistened lipstick is applied to the lips and the coating on the lip is allowed to dry, such coating does not rub off readily and it must be washed off.

I provide a lipstick which need not be moistened prior to use.

According to one embodiment of my invention, to which the invention is not limited, I provide a lipstick body or base which consists substantially wholly of wax material, and I use a water-soluble dye which is insoluble in said waxy body or base. I dissolve or disperse this dye in a solvent which is exemplified by propylene glycol. I add a surface-active agent or wetting agent to this dye solution or dispersion. This wetting agent is exemplified by polyethylene glycol leci-oleate. This dispersion is poured into molds and chilled to solidify the waxy base and to form the final lipstick. The dye solution is dispersed in the body of the finished lipstick in the form of fine aggregates, such as small drops and narrow veins of dye solution.

As one example, the waxy base is fusible at 80° C. to produce a fused waxy liquid which is miscible with said dye dispersion or solution, so that said dye dispersion or solution forms a dispersion in the fused waxy base and in the finished waxy base.

As one example of a dye solvent which is non-aqueous and which does not belong to the class of oils, I refer to commercial propylene glycol,

CH$_3$CHOHCH$_2$OH

This is fully described on page 530 of the 1942 edition of "The Condensed Chemical Dictionary," published by Reinhold Publishing Company. It has a boiling point of 187.4° C., and contains not more than 1% by weight of water. It is miscible with water and it is a good solvent for fats, oils, waxes, resins, dyes, etc. There is little or no evaporation of the solvent when the dye solution is mixed with the fused waxy base at 80° C.

If propylene glycol is used as a solvent or dispersing agent to dissolve all or a part of the water-soluble and oil-insoluble dye, it is highly preferable to provide a surface-active agent or wetting agent in the solution, so that the dye solution will effectively wet the waxy base in the process of manufacture and also in the final or finished lipstick.

The highly preferred wetting agent is polyethylene glycol leci-oleate, which is later fully identified. This is highly selective for the purposes of my invention. This wetting agent is also a good solvent for many of the water-soluble and oil-insoluble dyes. As one example, the liquid material of the dye solution may have substantially five parts by weight of the polyethylene glycol leci-oleate per part of the propylene glycol or other solvent.

While the invention includes the use of oil-soluble dyes, which may be insoluble in water, it is highly preferred to use dyes which are water-soluble and oil-insoluble.

My invention makes it possible to use in a lipstick or other cosmetic, one or more of the dyes which are designated as "F D & C," because they are certified as harmless dyes which may be used for coloring foods and beverages, in addition to coloring cosmetics, by the Federal Food, Drug & Cosmetic Administration of the United States of America. Nearly all of these "F D & C" dyes are water-soluble and insoluble in oils and waxes, and these are the highly preferred dyes. Some of these "F D & C" dyes are water-insoluble and soluble in oils and waxes, and such dyes are included in the broader aspect of the invention.

These "F D & C" dyes are identified and described in the following publications:

"Chemicals of Commerce," by Snell & Snell, published in 1952 by D. Van Nostrand Company, Inc.

"The Chemistry and Technology of Food & Food Products," by Jacobs, published in 1944 by Interscience Publishers, Inc.

Some of these "F D & C" dyes which are readily soluble in water, are specifically identified as follows:

"F D & C Red No. 1".—This was formerly known as "Ponceau 3R." Its general formula is $$C_{19}H_{16}N_2O_7S_2Na_2$$

It is the sodium salt of pseudocumylazo-beta-naphthol-3,6 disulfonic acid.

"F D & C Red No. 2."—This is also known as "Amaranth." Its general formula is $C_{20}H_{11}N_2O_{10}S_3Na_3$. It is the sodium salt of 4-sulfo-alpha-naphthylazo-beta-naphthol-3,6-disulfonic acid.

"F D & C Red No. 3."—This is also known as "Erythrosin." Its general formula is $C_{20}H_6O_5I_4Na_2.H_2O$. It is the sodium salt of tetra-iodo-fluorescein.

"F D & C Yellow No. 1."—This also known as "Naphthol Yellow." Its general formula is $C_{10}H_4N_2O_8SNa_2$. It is the sodium salt of 2,4-dinitro-alpha-naphthol-7-sulfonic acid.

The invention is further explained in the following drawings and description.

These lipsticks are made with the same waxy base, but with different coloring matters within the scope of said formula.

These micro-photographs were taken at a magnification of one hundred diameter, using a green monochromatic filter.

Figure 1:
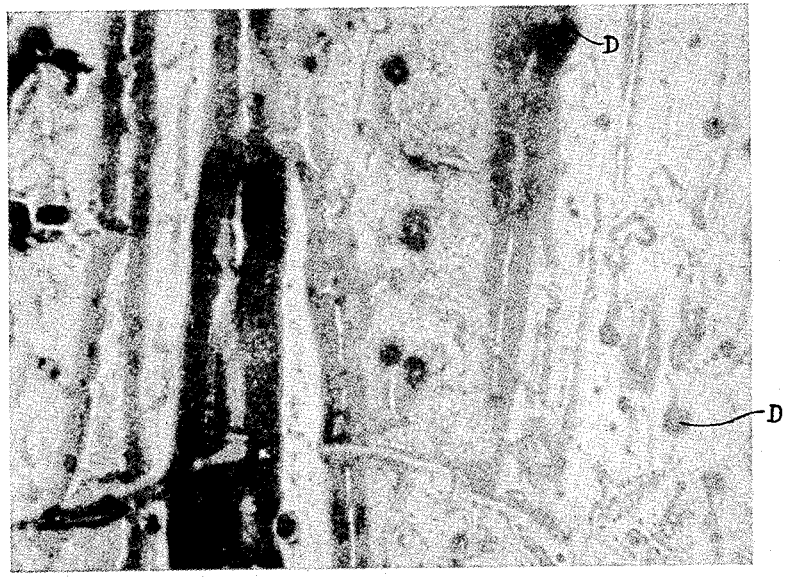
Fig. 1 is a reproduction of a micro-photograph of a finished lipstick which is made according to the specific formula later disclosed.

The coloring matter of the lipstick of Fig. 1 is "F D & C Red No. 3" and aluminum oxide.

Figure 2:
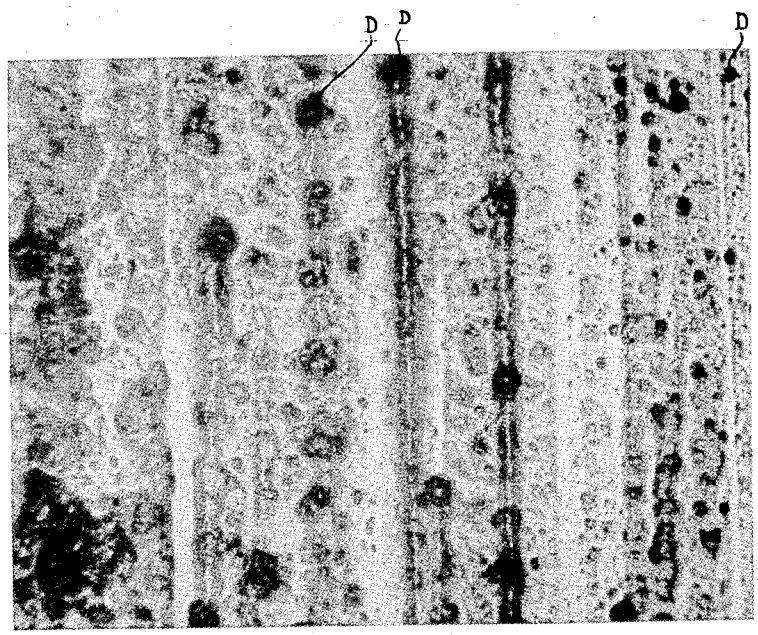
Fig. 2 is a reproduction of a micro-photograph of another finished lipstick which is made according to said specific formula.

The coloring matter of the lipstick of Fig. 2 is "F D & C Red No. 1," "F D & C Red No. 2," "F D & C Red No. 3," "F D & Yellow No. 1," aluminum oxide and titanium dioxide.

Without limitation to the ingredients and proportions stated below, the highly preferred specific formula for making a lipstick is stated below. All proportions in this description are by weight.

| Ingredient: | Parts by weight |
|---|---|
| (A) Carnauba wax, No. 1, yellow | 36 |
| (B) Flake Candelilla wax | 84 |
| (C) White beeswax | 48 |
| (D) Paraffin wax which has a melting point of 60° C. | 60 |
| (E) Spermaceti | 36 |
| (F) White ozokerite | 36 |
| (G) Anhydrous lanolin | 24 |
| (H) Propylene glycol | 100 |
| (I) Polyethylene glycol leci-oleate | 550 |
| (J) Propenyl methyl guaethol | 1.00 |
| (K) "F D & C" dye or dyes, and a pigment or pigments, such as aluminum oxide, zinc oxide, titanium dioxide, barium sulphate. These pigments are of maximum purity and of U. S. Pharmacopeia grades, when specified therein | 80–100. |

Ingredients (A) to (G) inclusive, form the base or body of the lipstick. These ingredients are waxes, with the exception of the anhydrous lanolin, which is used to smooth said waxes and to add a little oiliness.

The proportion of anhydrous lanolin in the base is only 24 parts per 324 parts, namely only about 7%, so that the base of the lipstick has about 93% of wax material, with no oil. Many formulas for the base of a lipstick have been published, as in "The Chemistry and Manufacture of Cosmetics" by the Navarre, published in 1941 by D. Van Nostrand Company Inc.; and "Modern Cosmeticology" by Harry, published in 1940 by Chemical Publishing Co. Inc. The invention is not limited to the specific formula for the base of the lipstick, because other formulas may be used. However, one of the advantages of my invention is that I can eliminate ingredients such as petroleum jelly, liquid paraffin or mineral oil, cocoa butter, butyl stearate and other ingredients which must be solidified by the wax material. Thus, in many typical formulas, the wax material is only a minor proportion of the lipstick.

As above noted, the propylene glycol, which is of known commercial grade, is a solvent for the dye or dyes.

In this formula, there are substantially five parts of polyethylene glycol leci-oleate per part of propylene glycol, in order to secure high wetting action of the dye solution during the process of manufacture and in the final lipstick.

As one specific example of ingredient (K), this may consist of 35 parts of "F D & C Red No. 3," 35 parts of aluminum oxide, 10 parts of zinc oxide, and 10 parts of barium sulfate. The 35 parts of "F D & C Red No. 3" are readily soluble in the 100 parts of propylene glycol at ordinary room temperature of 20° C.–25° C. as at 23° C.

Depending upon the dye or dyes and the proportions, some or all of the dye material may be dissolved in the propylene glycol. Some or all of the dyes may be soluble in the polyethylene glycol leci-oleate.

In the above formula, the major part of the ingredients are liquid in the finished lipstick, in which the base comprises 324 parts, the dye and pigment comprise a maximum of 100 parts, and the liquids comprise 650 parts.

Hence, in said optional specific formula, the polyethylene glycol leci-oleate ester comprises 52.22% by weight of the lipstick, namely, at least fifty percent by weight of the lipstick; the weight of the selected glycol is 9.49% of the weight of the lipstick, namely, substantially one-fifth of the weight of the polyethylene glycol leci-oleate ester or substantially ten percent of the weight of the lipstick. The weight of the fusible wax material is substantially 30% of the weight of the lipstick.

Method of manufacture

In this example, the specific formula is used, and ingredient (K) consists of 35 parts of "F D & C Red No. 3" and 65 parts of pigments, as above disclosed.

The 35 parts of the dye and the 100 parts of propylene glycol are mixed at 23° C. Depending upon the dye and the proportions, some or all of the dye is dissolved in the propylene glycol to make a true solution or a colloidal solution. The pigment is mixed at 23° C. with the dye solution and any undissolved dye therein, and this mixture is milled at 23° C. A fine and intimate and uniform and stable mixture is thus made, in which any undissolved dye is finely dispersed.

The polyethylene glycol leci-oleate is heated to 80° C. If the optional preservative ingredient (J) is used, this is dissolved in the heated glycol leci-oleate.

The first mentioned mixture is heated to 80° C. and it is mixed with the heated polyethylene glycol leci-oleate, while the latter is at 80° C. This mixture is thoroughly milled at 80° C.

As above noted, depending upon the dye, the polyethylene glycol leci-oleate ester may be a solvent for the dye, so that any dye which is not dissolved in the propylene glycol may be dissolved in the ester.

The 35 parts of the dye are dissolved in the 100 parts of propylene glycol at 23° C., to make a true solution or a colloidal solution or dispersion which has the properties of a true solution. This is done by thorough mixing. In some cases, depending upon the dye or dyes, the solvent and the proportion of dye to solvent, only some of the dye may be dissolved. The pigments are in very fine powder form. The 65 parts of pigments are mixed and milled with the dye solution at 23° C., to provide a uniform and stable mixture. If any dye is undissolved, it is uniformly dispersed in stable form in this mixture, which is designated as mixture No. 1.

The 550 parts of polyethylene glycol leci-oleate are heated to 80° C. If the preservative ingredient (J) is used, the one part of said preservative is dissolved in the 550 parts of polyethylene glycol leci-oleate at 80° C. The polyethylene glycol leci-oleate is a water-miscible liquid at 20° C.–25° C. and also at 80° C.

The above-mentioned mixture is heated to 80° C. and it is mixed with the polyethylene glycol leci-oleate while the latter is also at 80° C. This mixture is designated as mixture No. 2.

In some cases, the polyethylene glycol leci-oleate may dissolve any dye which is not dissolved in the propylene glycol.

The base or body, which is optionally and preferably anhydrous or substantially anhydrous, is fused at 80° C., to provide a flowable fused liquid.

The fused base is added slowly at 80° C., drop by drop, in the form of very small drops, to mixture No. 2, while mixture No. 2 is also at 80° C., with constant and thorough intermixing. The fine drops of the liquid fused base are thoroughly wetted by mixture No. 2 in the process of manufacture. A hot dispersion is thus formed at 80° C. As above noted, the propylene glycol and the polyethylene glycol leci-oleate comprise substantially 61.71% by weight of the above formula. By adding the 30.72% of the fused body material in the form of very small drops to this large excess of liquid, which has a large percentage of a very efficient wetting agent, it is possible to secure the final novel structure which is shown in Figs. 1 and 2.

This hot dispersion, at 80° C., is poured into molds, which are cooled to 20° C.–25° C. or other selected temperature, to form the final finished lipstick.

Perfumes or other additives may be incorporated.

There is little or no loss of any liquid ingredient during the process of manufacture, so that the final lipstick has substantially the above-mentioned formula.

The process of manufacture may be conducted in air at normal pressure of 760 millimeters of mercury.

*Process of manufacture of the polyethylene glycol leci-oleate ester*

25 pounds or about 11.25 kilograms of polyethylene glycol are put into an autoclave. This polyethylene glycol has a molecular weight of 400, and it is of U. S. Pharmacopeia grade.

35 grams of concentrated sulfuric acid are added to the 11.25 kilograms of polyethylene glycol in the autoclave, to act as a catalyst. The sulfuric acid is added drop by drop, with constant agitation. This may be done in air at said normal pressure, and at 20° C.–25° C.

A dispersion of lecithin in oleic acid is made in a container other than said autoclave. Lecithin contains an amino alcohol which is known as chlonie. The lecithins have two hydroxyl groups of glycerol which are combined with fatty acid radicals. The third hydroxyl of lecithin is esterified by phosphoric acid, which in turn is combined with said choline. ("Organic Chemistry" by Desha, published in 1936 by McGraw-Hill Book Company, Inc., pages 369 and 653). Hence, the lecithin is one of the reactants in this reaction. The weight of the lecithin is 4.25 pounds or about 1.92 kilograms. The weight of the oleic acid, which is of U. S. Pharmacopeia grade, is 17.5 pounds or about 7.875 kilograms. This dispersion is made at 20° C.–25° C.

This dispersion is mixed with the acidified polyethylene glycol in the autoclave, at 20° C.–25° C.

The autoclave is then closed, and the contents of the autoclave are rapidly heated to 100° C. This temperature is maintained for ten minutes. The closed autoclave contains air at said normal pressure of 760 millimeters of mercury, prior to said heating. After said heating period of ten minutes at 100° C., the closed autoclave is rapidly cooled until its internal pressure is 15 millimeters of mercury. The closed autoclave is kept under this pressure of 15 millimeters of mercury for six hours.

The autoclave is then opened and the acidity of the reaction mass is lowered to a pH of 6.0, by adding an aqueous solution of sodium hydroxide or other neutralizing agent.

The new mixed ester which is thus formed is mixed with water. This water is removed by heating the mixture at 100° C. under reduced pressure.

Instead of using a polyhydric alcohol in the manufacture of this ester, I can use monohydric alcohols which have at least 12 carbon atoms, such as myristyl alcohol and cetyl alcohol.

Instead of using oleic acid to make this ester in combination with polyethylene glycol or other polyhydric alcohol or said monohydric alcohols, I can use other fatty acids, such as stearic acid, palmic acid, lauric acid, and myristic acid.

Hence the invention generally includes the use of the new mixed esters of lecithin and fatty acids with a polyhydric alcohol or with a monohydric alcohol which has at least 12 carbon atoms. Such monohydric alcohols are often designated as the fatty alcohols.

Polyethylene glycol leci-oleate is the highly preferred ester, because it has certain special and unique properties.

It is partly hydrophilic and partly hydrophobic, so that it causes effective wetting of the waxy base by the propylene glycol or other dye-solvent. Being water-miscible, it aids in the penetration of the dye, particularly a water-soluble dye, in the skin. It is also somewhat hygroscopic and it is a good emulsifying agent. It is also substantially non-ionic. It is a viscous liquid at 20° C.–25° C., it is substantially non-volatile at 20° C.–25° C. or at the temperature of 80° C. which is used in the manufacture, and it is unctuous, bland-lubricating and has a low vapor pressure. As above noted, it is a good solvent for the "F D & C" dyes and other dyes. It is also a good dispersing agent for any undissolved dye.

If oleic acid is used to make the new mixed ester, which is preferred, said oleic acid should preferably have the following characteristics:

| | |
|---|---|
| Titer | 8°–10° maximum. |
| Free fatty acids | 98–100 percent. |
| Unsaponifiable matter | 0.7 percent. |
| Ash | None. |
| Color | 10Y–1 orange. |

Instead of using anhydrous lanolin in the body or base, I can use wool wax, which is rich in cholesterin and oxy-colesterins.

The body or base may include Japan wax, ceresin, and ouricuri, which is like Japan wax.

Instead of using propylene glycol to dissolve the dye or dyes or a part thereof, I can use polypropylene glycol or "Carbitol," which is diethylene glycol monoethyl ether, $CH_2OHCH_2OCH_2CH_2OC_2H_5$, which is described on page 260 of said "The Condensed Chemical Dictionary."

Instead of using polyethylene glycol to make the ester, I can use butylene glycol, ethylene glycol, polypropylene glycol, and "Carbowax." The "Carbowax" may be liquid or solid.

"Carbowax" identifies non-volatile polyethylene glycols, which are soluble in water and in aromatic hydrocarbons. They are fully described on page 110 of "Handbook of Material Trade Names," by Zimmerman & Lavine, 1953 edition, published by Industrial Research Service.

I can also use talc as a pigment.

Instead of using a mixer ester of the above-mentioned class as a wetting agent, I can use a mixture of 4 parts of "Span" to one part of "Tween," as a preferred ratio. This ratio is selected so as not to be too hygroscopic. The invention is not limited to this ratio.

The "Spans" are fully identified on pages 524–525 of said "Handbook of Material Trade Names." They are long-chain fatty acid partial esters of hexitol anhydrides, including sorbitans, sorbides, mannitans, and mannides. They are used in dispersing water-soluble oils and waxes and in making emulsions of various types.

The "Tweens" are also non-ionic surface-active agents which have emulsifying and wetting properties. They are polyoxyalkylene derivatives of hexitol anhydride partial long chain fatty acid esters. They are fully described on pages 586–587 of said "Handbook of Material Trade Names."

Figs. 1 and Fig. 2 herein show dye D distributed throughout the body of the lipstick in the form of small drops and narrow veins. The distribution of the dye D will depend, to some extent, upon the composition of the body or base of the lipstick. As above noted, it is preferable to incorporate all the dye, or at least a major portion thereof, in dissolved form.

The micro-photographs of Fig. 1 and Fig. 2 show a lipstick which is made according to the specific example.

The solution or dispersion of the dye or dyes is identified by the dark tones in Figs. 1 and 2.

I have described numerous alternatives, and the disclosure herein is subject to numerous additions, substitutions, omissions and variations, without departing from the scope of the invention.

However, for the best and highly preferred embodiment of my invention, it is preferred to use polyethylene glycol leci-oleate, which is substantially unsaponified, due to accurate neutralization of the original acidity which is produced by the acid catalyst, as the agent for lowering the surface tension of the solvent, so that the solvent wets the waxy base of the substantially anhydrous article.

Also, said proportion of propylene glycol or other solvent to said polyethylene glycol leci-oleate is a desirable and preferred feature of the invention.

Whenever I refer to a solvent in any claim, this may be a single solvent or a mixed solvent.

When a lipstick is made according to the specific formula above mentioned, by the process above mentioned, said lipstick has a melting point of substantially 53° C.

The invention applies to all cosmetics which are solids at 20° C.–25° C. and also to creams and other cosmetics and articles which can be used as coating agents.

When I refer to polyethylene glycol or other substantially non-aqueous solvent for the dye, I include a solvent which has a minor proportion of water.

I claim:

1. A substantially anhydrous lipstick which has a base which consists substantially wholly of fusible wax material and a mixture of propylene glycol and polyethylene glycol leci-oleate ester, said lipstick having dye incorporated therein, substantially all of said dye being soluble in water, said polyethylene glycol leci-oleate ester being compatible with said fusible wax material and being a solvent for said dye, said polyethylene glycol leci-oleate ester comprising at least substantially fifty percent by weight of said lipstick, said propylene glycol comprising substantially ten percent by weight of said lipstick, said water-soluble dye being wholly dissolved in said mixture of said propylene glycol and said polyethylene glycol leci-oleate ester, at least some of said dye being dissolved in the polyethylene glycol leci-oleate ester of said mixture, the solution of said dye in said mixture being dispersed in said fusible wax material in the form of drops and veins.

2. A substantially anhydrous lipstick which has a base which consists substantially of fusible wax material and a mixture of propylene glycol and polyethylene glycol leci-oleate ester, said lipstick having dye material incorporated therein, said fusible wax material comprising substantially 30% by weight of said lipstick, said propylene glycol comprising substantially 10% by weight of said lipstick, said polyethylene glycol leci-oleate ester comprising substantially 52 percent by weight of said lipstick, substantially all of said dye material being soluble in water, said dye being soluble in said propylene glycol and in said polyethylene glycol leci-oleate ester and in said mixture, the solution of said dye material in said mixture being dispersed in said fusible wax material in the form of drops and veins.

References Cited in the file of this patent

UNITED STATES PATENTS

| | | |
|---|---|---|
| 1,869,782 | Sternberg | Aug. 2, 1932 |
| 1,958,700 | Harris | May 15, 1934 |
| 2,062,782 | Epstein | Dec. 1, 1936 |
| 2,310,679 | De Groote | Feb. 9, 1943 |
| 2,555,972 | Karjala | June 5, 1951 |

FOREIGN PATENTS

| | | |
|---|---|---|
| 447,256 | Great Britain | May 11, 1936 |

OTHER REFERENCES

Yates: Ind. Chem., Aug. 1941, p. 205.

Chem. by Glyco, 1948, p. 14.

Thomsen: Mod. Cos., 3rd ed., 1947, pp. 296–298, 299, 300–307.

Hilfer: Drug and Cos. Ind., vol. 65, Nov. 1949, pp. 518, 519.

Hilfer: Drug and Cos. Ind., vol. 69, Sept. 1951, pp. 314, 315, 417.

Drug and Cos. Ind., vol. 70, May 1952, p. 661.

De Navarre: Am. Perf. and Ess. Oil Rev., Nov. 1950, p. 365.